United States Patent Office 2,937,194
Patented May 17, 1960

2,937,194

PRODUCTION OF ESTERS OF PHOSPHORIC ACID AND THIONOPHOSPHORIC ACID

Harald Schroeder and Heinz Pohlemann, Ludwigshafen (Rhine), Herbert Stummeyer, Mannheim, and Heinrich Adolphi, Limburgerhof, Pfalz, Germany, assignors to Badische Anilin- & Soda-Fabrik Aktiengesellschaft, Ludwigshafen (Rhine), Germany No Drawing. Application September 24, 1957
Serial No. 685,810

Claims priority, application Germany September 28, 1956

9 Claims. (Cl. 260—461)

This invention relates to a process for the production of alkylphosphoric acid or alkylthionophosphoric acid esters by the reaction of dialkylphosphoric or dialkylthionophosphoric acid halides with hydroxy- or dihydroxysuccinic acids or their half esters.

It is already known that neutral esters of orthophosphoric acid or thionophosphoric acid are obtained by allowing compounds containing hydroxy groups, as for example alcohols or phenols, to act on phosphorus oxyhalides, monochlorides or dichlorides of alkoxyphosphoric acid or on the corresponding thionophosphorus compounds. Compounds of this kind have already been prepared in large numbers and exhibit insecticidal, fungicidal or rodenticidal activity of varying strength.

We have now found that a new class of alkylphosphoric acid or alkylthionophosphoric acid esters are obtained by reacting a dialkylphosphoric acid halide of the general formula

in which $R_1$ and $R_2$ represent alkyl radicals with 1 to 4 carbon atoms and X an oxygen or a sulfur atom and Hal a halogen atom with hydroxysuccinic acids or their half esters of the general formula $$\begin{array}{c} HO-CH-COOR_4 \\ | \\ R_3-CH-COOH \end{array} \quad (II)$$

in which $R_3$ represents a hydrogen atom, a hydroxyl group, which may if desired also be etherified or esterified, or a halogen atom and $R_4$ a hydrogen atom or an alkyl group. $R_3$ represents in particular an alkoxy radical with up to six carbon atoms, for example a methoxy, ethoxy, propoxy or butoxy radical or a carboxy-alkyl radical with 2 to 6 carbon atoms, especially an acetyl or propionyl radical. The halogen is especially bromine or chlorine.

If $R_3$ represents a hydroxyl group, either one or both of the hydroxyl groups of the dihydroxysuccinic acid or its half ester may react depending on the ratio of the initial amounts, i.e. when using an excess of the succinic acid component only one hydroxy group is esterified, and in the converse case both hydroxyl groups are esterified. In addition, however, one or both carboxylic groups of the hydroxysuccinic acids or their half esters or also one or both carboxylic groups of the dihydroxysuccinic acid may be reacted with dialkylphosphoric acid or dialkylthionophosphoric acid halides. In this case a corresponding excess of dialkylphosphoric or -thionophosphoric acid halide is used for the reaction. $R_4$ represents especially an alkyl group with 1 to 6 carbon atoms, for example a methyl, ethyl or propyl group. In this reaction substances of the following formula are obtained $$\begin{array}{c} X-CH-COA \\ | \\ D-CH-COB \end{array}$$

In this formula X is a radical of dialkylthionophosphoric acid with the formula

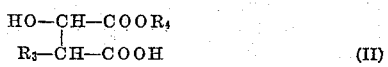

wherein $R_1$ is an alkyl group with 1 to 4 carbon atoms, A is a radical selected from the group consisting of hydroxyl, $OR_1$ and X; B is a radical selected from the group consisting of hydroxyl, $OR_1$ and X; D is a radical selected from the group consisting of hydroxyl, $OCOR_1$, $OR_1$, X and halogen, and A and B may not simultaneously be $OR_1$.

Suitable hydroxysuccinic acids or hydroxysuccinic acid half esters according to the described formula are for example alpha-hydroxysuccinic acid, alpha-hydroxysuccinic acid monomethyl ester, alpha-hydroxysuccinic acid monoethylester, alpha.beta-dihydroxysuccinic acid, alpha.-beta-dihydroxysuccinic acid monomethyl ester, alpha-hydroxy-beta-chlorsuccinic acid and alpha-hydroxy-beta-methoxysuccinic acid and their half esters.

Suitable halides of O.O-dialkylphosphoric or -thionophosphoric acids for the reaction are for example dimethyl-, diethyl-, dipropyl- or dibutyl-phosphoric or -thionophosphoric acid chloride, bromide or iodide.

In the reaction of one hydroxy group it is suitable to react the said initial materials with each other in equivalent amounts. If it is desired however to react two or more hydroxyl groups with dialkyl-phosphoric or -thionophosphoric acid halides, these must be used in at least a double or triple excess.

The reaction is suitably carried out in the presence of a solvent, as for example a hydrocarbon, such as petroleum ether, cyclohexane, benzene or toluene, or a chlorohydrocarbon, such as methylene chloride. Ethers, as for example tetrahydrofurane or dioxane, and also ketones, as for example acetone or methyl ethyl ketone, may however also be added as solvents.

Although the reaction already proceeds in the cold, it is suitable to work at elevated temperatures, for example between 15° and 120° C., preferably between 30° and 80° C. The hydrogen halide formed is advantageously bound by the addition of agents which bind hydrogen halide, as for example tertiary amines, such as triethylamine or pyridine, or by alkali carbonates or alkali bicarbonates. The liquid base can wholly or partly replace the solvent otherwise necessary.

The substances accessible for the first time according to this invention are generally characterized by a good insecticidal action with low toxicity.

In particular, the substances are useful for combatting Diptera, i.e. *Musca domestica, Stomoxys calcitrans* (imago and larvae), *Pegomya hyosciami*; Aphiodoidea i.e. *Mycus persicae, Hyaloptherus arundinis* and Tetranychidae.

It is surprising that in the reaction of substances which still contain free carboxyl groups with dialkylphosphoric or -thionophosphoric acid halides there should be obtained insecticides which are superior to the corresponding compounds originating from hydroxysuccinic acid dialkyl esters by a multiple in their activity.

The following examples will further illustrate this invention but the invention is not limited to these examples. The parts specified in the examples are parts by weight.

Example 1

1340 parts of alpha-hydroxysuccinic acid are dissolved in a mixture of 1650 parts of pyridine and 2000 parts of benzene. 1880 parts of O.O-diethylthionophosphoric acid chloride are slowly allowed to flow into this solution and the temperature is kept at 20° to 25° C. Then the product is stirred for 5 hours at 50° C., 1500 parts of benzene are added when it is cold, washed with water, dried and the solvent distilled off under reduced pressure. There are obtained as a residue 1243 parts of O.O-diethyl-O-(alpha.beta-dicarboxylethyl)-thionophosphate as a yellow-brown non-distillable oil. This is 43.5% of the theoretical yield. The product has the structural formula

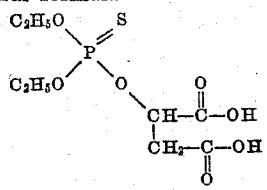

Example 2

134 parts of malic acid are suspended in 1000 parts of benzene and stirred with 650 parts of pyridine with good stirring. Then 376 parts of diethylthionophosphoric acid chloride are dripped into the mixture, it is stirred for 5 hours at 45° to 50° C., 300 parts of water are added and the mixture made slightly acid with dilute hydrochloric acid. It is shaken several times with water, dried and the benzene layer dried and the solvent then evaporated under reduced pressure. There are obtained as a residue 330 parts of the new compound with the formula $C_{12}H_{24}O_9S_2P_2$ as a brownish non-distillable oil. The yield is 76% of the theoretical yield.

Example 3

13.4 parts of malic acid are dissolved in 100 parts of benzene with the aid of 70 parts of pyridine. Then while stirring well, 56.4 parts of diethylthionophosphoric acid chloride are allowed to flow in and the whole stirred for another 5 to 6 hours at 50° C. It is allowed to cool, 100 parts of benzene are added and 30 parts of water, the whole is made slightly acid with dilute hydrochloric acid and then shaken up with water. The benzene solution is dried, the benzene distilled off under reduced pressure and 41 parts of the new compound having the formula $C_{16}H_{33}O_{11}S_3P_3$ are obtained as a brownish non-distillable oil with very good insecticidal properties. The yield is 69.5% of the theoretical yield. The reaction product has the formula

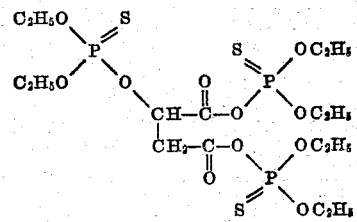

Example 4

134 parts of malic acid are dissolved in 600 parts of methylenechloride and 330 parts of dry pyridine with good stirring. Then 481 parts of O.O-dimethylthionophosphoric acid chloride are dripped under good stirring into the mixture. The mixture is stirred for five hours at a temperature from 50° to 55° C. After cooling to room temperature 100 parts of water are added, organic layer is separated and stirred two times with 100 parts of water, dried and the solvent distilled off under reduced pressure. There are obtained as a residue 360 parts of a yellow non-distillable oil of the formula:

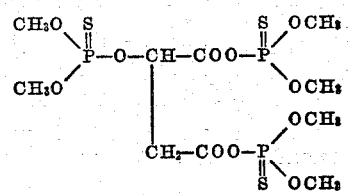

Example 5

37.5 parts of alpha.beta-dihydroxysuccinic acid are stirred with 150 parts of chloroform and 40 parts of pyridine. To this mixture are dripped under good stirring 47 parts of O.O-diethylthionophosphoric acid chloride at room temperature. The mixture is stirred 5 hours at 50° C. After cooling the mixture is worked up as described above. 30 parts of a compound with good insecticidal action are obtained as a yellow oil.

Example 6

15 parts of alpha.beta-dihydroxysuccinic acid are stirred with 120 parts of chloroform and 20 parts of pyridine. Then 75.2 parts of O.O-diethylthionophosphoric acid chloride are dripped into the mixture under good stirring at 25° to 30° C. The mixture is stirred ten hours at 45° to 50° C., cooled and worked up as described in Example 4. 65 parts of a yellow non-distillable oil are obtained which has the formula

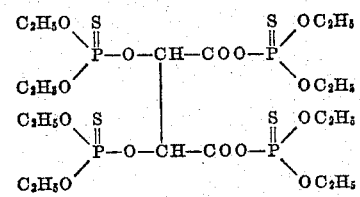

Example 7

168 parts of alpha-hydroxy-beta-chloro succinic acid are suspended in 650 parts methylene chloride. Then 564 parts of O.O-diethylthionophosphoric acid chloride are dripped into the mixture under good stirring.

The mixture is stirred 4 hours at 55° to 60° C. and cooled to room temperature. 100 parts of water are added and then the organic layer is separated and stirred two times with water. After separation of pyridine and pyridinehydrochloride the organic layer is worked up as described above.

420 parts of a compound of the formula

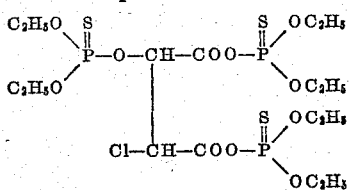

are obtained as a yellow non-distillable oil.

Example 8

162 parts of alpha-hydroxy succinic acid monoethylester are dissolved in 330 parts of pyridine. 376 parts of O.O-diethylthionophosphoric acid chloride are dripped into the solution which is stirred 5 hours at 40° to 50° C., cooled and worked up as described above.

295 parts of a compound of the formula

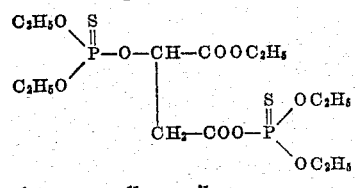

are obtained as a yellow oil.

We claim:
1. A process for the production of alkylphosphoric acid esters which comprises reacting a dialkylthionophosphoric acid halide of the general formula

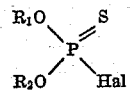

in which $R_1$ and $R_2$ represent alkyl radicals with 1 to 4 carbon atoms, and Hal a halogen atom with a compound of the general formula

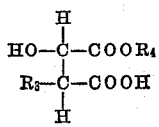

in which $R_3$ is a radical selected from the group consisting of hydrogen, bromine, chlorine, a hydroxyl and $R_4$ is a radical selected from the group consisting of hydrogen and lower alkyl at a temperature from about 15° to about 120° C.

2. A process as claimed in claim 1 wherein the reaction is carried out in the presence of a tertiary amine capable of binding hydrogen halide.

3. A process as claimed in claim 2 wherein pyridine is used as the agent for binding hydrogen halide.

4. A compound of the general formula

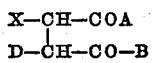

wherein X is a radical of dialkylthionophosphoric acid with the formula

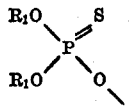

wherein $R_1$ is a alkyl group with 1 to 4 carbon atoms; A is a radical selected from the group consisting of hydroxyl, $OR_1$ and X; B is a radical selected from the group consisting of hydroxyl, $OR_1$ and X; D is a radical selected from the group consisting of hydroxyl, X, chlorine and bromine, and wherein A and B may not simultaneously be $OR_1$.

5. A compound of the formula

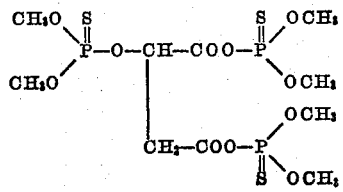

6. A compound of the formula

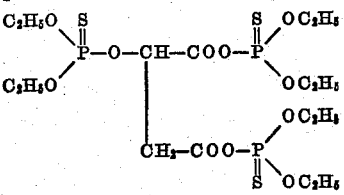

7. A compound of the formula

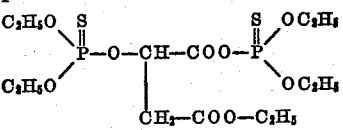

8. A compound of the formula

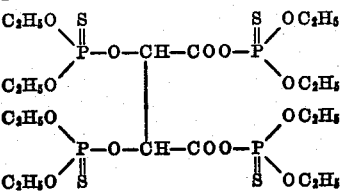

9. A compound of the formula

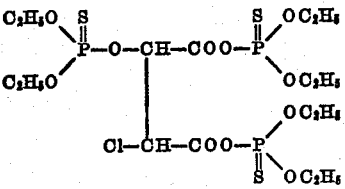

References Cited in the file of this patent

UNITED STATES PATENTS

| | | |
|---|---|---|
| 2,578,652 | Cassaday | Dec. 18, 1951 |
| 2,625,536 | Kirby | Jan. 13, 1953 |
| 2,645,657 | Rudel et al. | July 14, 1953 |
| 2,713,018 | Johnson | July 12, 1955 |
| 2,788,359 | Grundmann et al. | Apr. 9, 1957 |

FOREIGN PATENTS

| | | |
|---|---|---|
| 1,006,854 | Germany | Apr. 25, 1957 |
| 1,011,416 | Germany | July 4, 1957 |